Figure 1:
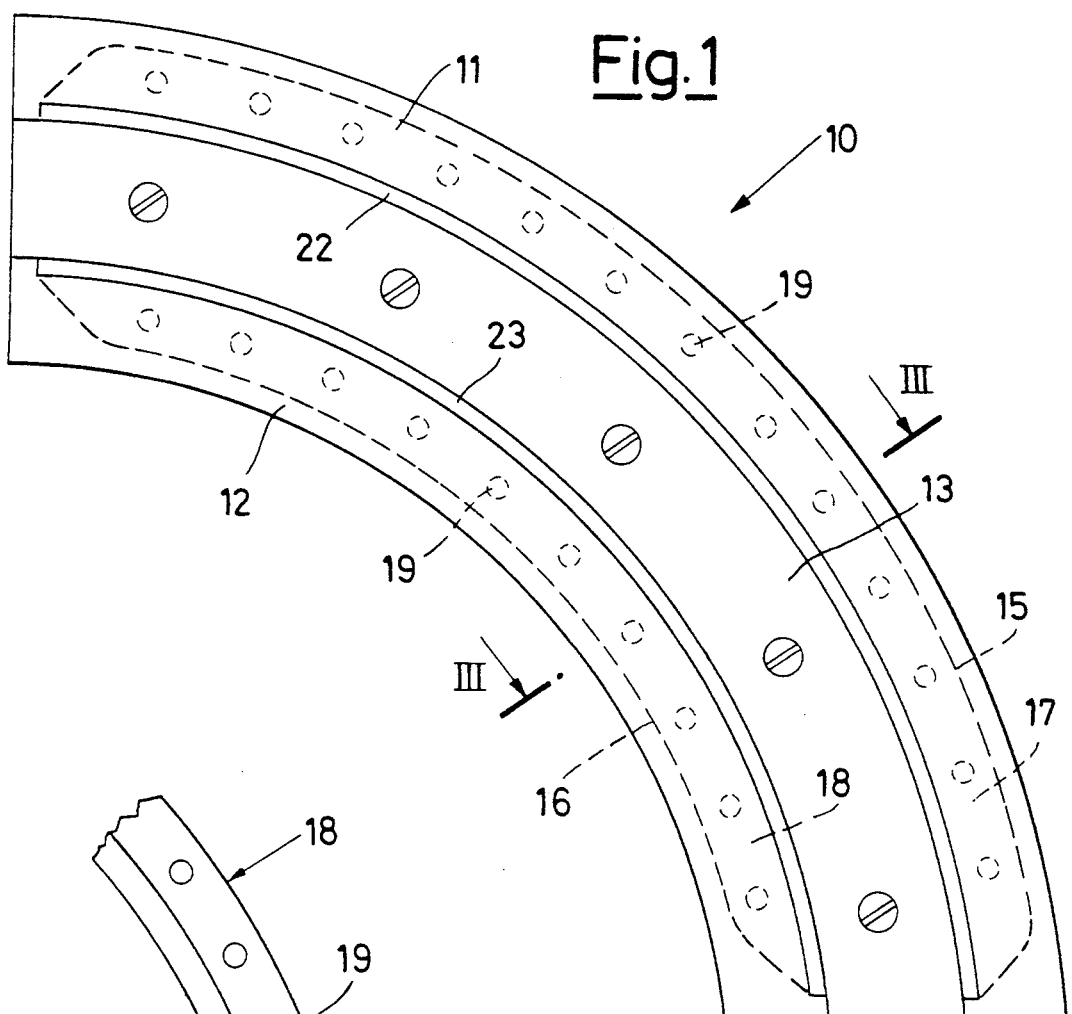

United States Patent [19]

Garbagnati

[11] Patent Number: 5,165,527
[45] Date of Patent: Nov. 24, 1992

[54] CHAIN CONVEYOR

[75] Inventor: Carlo Garbagnati, Castello Brianza, Italy

[73] Assignee: Regina Sud S.p.A., Latina, Italy

[21] Appl. No.: 653,417

[22] Filed: Feb. 11, 1991

[30] Foreign Application Priority Data

Mar. 20, 1990 [IT] Italy .............. 20859/90[U]

[51] Int. Cl.⁵ .............................................. B65G 15/60
[52] U.S. Cl. ................................ 198/805; 198/690.1; 198/831
[58] Field of Search ............ 198/805, 690.1, 831

[56] References Cited

U.S. PATENT DOCUMENTS

| | | | |
|---|---|---|---|
| 3,581,873 | 6/1971 | Spodig | 198/690.1 |
| 3,980,173 | 9/1976 | Riggs | 198/805 X |
| 4,236,632 | 12/1980 | Spodig | 198/690.1 |
| 4,643,298 | 2/1987 | Wallaart | 198/805 |
| 4,742,906 | 5/1988 | Wallaart | 198/805 |
| 4,805,764 | 2/1989 | van Zijderveld, Jr. | 198/805 |
| 4,823,939 | 4/1989 | Langhans et al. | 198/805 |
| 5,027,942 | 7/1991 | Wallaart | 198/805 |
| 5,036,969 | 8/1991 | Garbagnati | 198/805 |

Primary Examiner—Robert P. Olszewski
Assistant Examiner—Cheryl L. Gastineau
Attorney, Agent, or Firm—Stevens, Davis, Miller & Mosher

[57] ABSTRACT

A chain conveyor comprises a link chain (14) with flat elements of ferromagnetic material joined centrally by articulation elements and a guide track (10) consisting of side shoulders (11, 12) identifying a central channel (13). The side shoulders (11, 12) have flat upper surfaces on which run the flat elements of the chain near magnets (19) which are inserted in grooves (15,16) lateral to the shoulders (11, 12) said grooves being subsequently closed by strips (22, 23).

10 Claims, 1 Drawing Sheet

CHAIN CONVEYOR

The present invention relates to a chain conveyor of the type having generally flat upper conveying surfaces. In the chain conveyor art there is the known embodiment consisting of curved sections of the guide tracks in which are located under the running plane of the conveyor magnets which hold the links made of ferromagnetic material of the conveyor virtually in adherence on the running plane despite the forces generated by the curved path to which said links subject. The guide consist in general of two shoulders on which rest the tops of the chain links, which together identify a channel in which the links are received and pivoted. The shoulders can have the configuration of an overturned U to identify recesses to contain the magnets. For easier positioning of the magnets this recess can be made up of a plurality of aligned seats each of which contains a magnet and closed by a bottom strip as illustrated for example in European patent EP 0 159 074.

Such a solution is however rather difficult to realize as it requires considerable machining to obtain a plurality of seats in the body of the rail. In addition, having to position a plurality of magnets involves a certain amount of manual work which is also obstructed by the relatively high force of mutual attraction and repulsion of the magnets.

In addition, relatively complex means are required to push the magnets from below toward the upper face of the guides on which the chain runs and to maintain them in this position so as to minimize the air gap.

Finally, said solution is rather inflexible since it is necessary to change the entire rail if it is desired to change the magnetic attraction force exerted on the running conveyor by using different magnets, even as to size.

The general object of the present invention is to obviate the above mentioned shortcomings by providing a rail with magnets easy to fabricate and install and which would assure correct positioning of the magnets.

In view of said object there is provided in accordance with the invention a chain conveyor comprising a link chain with flat elements of ferromagnetic material joined centrally by articulation elements and a guide track consisting of side shoulders identifying flat upper surfaces on which run the flat elements of the chain near magnets housed in the shoulders and said shoulders identifying a central channel in which run the articulation elements of the chain and on the sides of which rest complementary projections of the chain to guide said chain laterally and characterized in that said shoulders each comprise a continuous groove open at the sides and housing an element complementary thereto and comprising seats in which are received said magnets. To further clarify the explanation of the innovative principles of the present invention and its advantages as compared with the known art there is described below with the aid of the annexed drawings possible embodiments as examples applying said principles.

Figure 2:
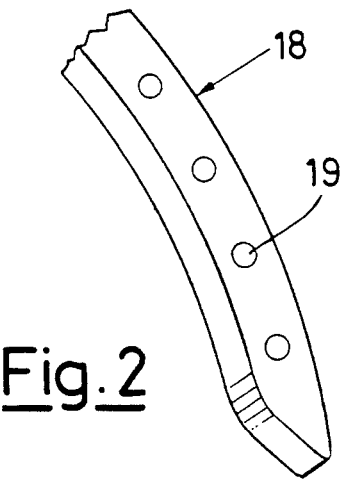
Figure 3:
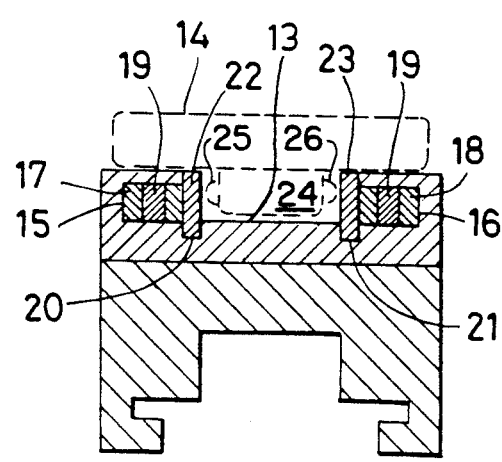

In the drawings:

FIG. 1 shows a schematic top view of a curved running track of a chain conveyor provided in accordance with the present invention, FIG. 2 shows a schematic partial perspective view of an element of the track of FIG. 1, and FIG. 3 shows a schematic cross section view along plane of cut III—III of FIG. 1.

With reference to the figures a track for a chain conveyor indicated generally by reference number 10 comprises in accordance with the invention two side shoulders 11 and 12 which identify virtually flat upper surfaces and a central running channel 13 for the link elements (one of which is drawn schematically in broken lines in FIG. 3 and indicated by reference number 14) of ferromagnetic material. In accordance with the innovative principles claimed herewith, along the entire section of track where magnets are to be provided there is made in each of the side shoulders 11 and 12 a continuous groove 15 and 16, respectively, with side openings facing the channel 13. Each of said continuous grooves 15 and 16 is a seat for a complementary element 17 and 18 respectively.

One of said elements 17, 18 is shown partially in FIG. 2. Said elements 17, 18 contain magnets 19 for example in the form of cylindrical magnets with vertical axes. The elements 17, 18 are advantageously moulded of plastic.

The seats for the magnets 19 can be made advantageously in the form of holes in said elements and the magnets can be subsequently inserted in said seats. The holes which receive them can be either through passing with closures at the bottom ends and receive advantageously the magnets with side interference to prevent undesired extraction. Alternatively, the magnets can be incorporated directly during molding of the elements.

It is clearly advantageously possible to position the magnets at short regular intervals so as to obtain at the top of the shoulders 11 and 12 a substantially uniform magnetic field and thus facilitate uniform running of the chain conveyor. This is facilitated by a cylindrical form with vertical axis of the magnets. It is also possible to provide elements with different kinds of magnets or spacing between them to be applied alternatively to the same type of guide body 10 depending on the characteristics of magnetic adherence required for the conveyor.

On the bottom of the channel 13 near and parallel to each groove 15, 16 there are made seats 20, 21 to receive each one the lower edge of a strip 22, 23 respectively. The articulation elements 24 of the chain ride within the channel 13. On the sides of the articulation elements 24 rest complementary projections 25, 26. Said strips 22 and 23 close the respective grooves 15 and 16 and, being advantageously provided of low friction material, constitute side and top sliding surfaces for the links of the conveyor while supplying side guidance for the chain elements thanks to the central part projecting at the bottom of the latter.

From the above description it may be seen how the proposed objects are reached.

Indeed, provision of the track is extremely simple both by milling and by casting since the seats of the magnets consist of a continuous groove with a substantially uniform cross section along each of the two shoulders of the track.

The use of continuous elements inserted in the grooves in the rail shoulders gives great torsional rigidity to the rail and also provides uniform support for the upper part of the shoulders, thus avoiding any bending.

Assembly of the constituent parts of the curve is very easy since it is sufficient to insert the elements 17 and 18 already containing the magnets and, finally, insert in place the sliding strips 22 and 23.

The above mentioned difficulties of the known art of providing in the track a plurality of seats or pockets for the individual magnets and subsequently inserting in each seat of said plurality a magnet while in the meantime taking care that the attraction and repulsion forces of the magnets do not move them or extract them from the seats before completion of filling and be able thus to proceed with fixing them in place are completely eliminated.

Although the invention has been described for a specific embodiment it is evident that many alternatives and variations, such as in materials and dimensions, will be apparent to those skilled in the art in light of the foregoing description. Accordingly, the invention is intended to embrace all of the alternatives and variations that fall within the spirit and scope of the invention. For example, there could be provided the elements 17 and 18 comprising directly the strips 22 and 23 moulded in a single piece therewith or cemented. In this case the groove 20 and 21 will be absent and the elements 17, 18 with incorporated strips will be held in their seats by for example simple insertion with interference in the seats 15 and 16.

Even though in the above description the grooves 15 and 16 are open at the sides toward the inside of the rail, it is possible to provide the grooves 15 and 16 with side opening toward the outside of the rail.

Finally, even if the cylindrical form of the magnets is advantageous for the simplicity of making seats in the elements 17 and 18 it would be possible to have magnets of any form while making the appropriate seats in said elements.

I claim:

1. Chain conveyor comprising a link chain with flat elements of ferromagnetic material joined centrally by articulation elements and a guide track consisting of side shoulders identifying flat upper surfaces on which run the flat elements of the chain near magnets housed in the shoulders and said shoulders identifying a central channel in which run the articulation elements of the chain and on the sides of which rest complementary projections of the chain to guide said chain laterally and characterized in that said shoulders each comprise a continuous groove open at one side and housing an element complementary thereto and comprising seats in which are received said magnets.

2. Conveyor in accordance with claim 1 characterized in that said continuous grooves are open at the sides on the face of the shoulders turned toward said central channel.

3. Conveyor in accordance with claim 1 characterized in that the magnet seats are open at the top.

4. Conveyor in accordance with claim 1 characterized in that the magnet seats are through passing.

5. Conveyor in accordance with claim 1 characterized in that said magnets have a substantially cylindrical form and are positioned with vertical axes.

6. Conveyor in accordance with claim 1 characterized in that said magnets are received in respective seats with interference.

7. Conveyor in accordance with claim 2 characterized in that each of said continuous grooves in the shoulders has the said side opening closed by closing elements extending the entire length of the groove to constitute a running surface at least on the side for the chain elements.

8. Conveyor in accordance with claim 7 characterized in that said closing elements are strips with their lower edge restrained in a complementary seat made in the bottom of the groove between the shoulders near and parallel to each continuous groove.

9. Conveyor in accordance with claim 7 characterized in that said closing elements extend at least to the upper surfaces of said shoulders to constitute upper running surfaces for the chain elements.

10. Conveyor in accordance with claim 7 characterized in that said closing elements are fixed to said complementary elements comprising the magnet seats.

* * * * *